(12) United States Patent
Kumagai

(10) Patent No.: US 7,184,976 B1
(45) Date of Patent: Feb. 27, 2007

(54) APPARATUS WHICH CAN BE CONNECTED TO NETWORK, AND CHARGING MANAGEMENT SYSTEM

(75) Inventor: Takekazu Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 788 days.

(21) Appl. No.: 09/658,672

(22) Filed: Sep. 8, 2000

(51) Int. Cl.
*G06Q 40/00* (2006.01)

(52) U.S. Cl. .......................................... 705/32; 705/34
(58) Field of Classification Search .................. 705/52, 705/26, 32, 34; 707/102
See application file for complete search history.

(56) References Cited

U.S. PATENT DOCUMENTS

| | | | | |
|---|---|---|---|---|
| 5,842,023 A | * | 11/1998 | Tsumura | 717/170 |
| 5,884,280 A | * | 3/1999 | Yoshioka et al. | 705/26 |
| 5,901,228 A | * | 5/1999 | Crawford | 705/34 |
| 6,016,509 A | * | 1/2000 | Dedrick | 709/224 |
| 6,151,600 A | * | 11/2000 | Dedrick | 707/10 |
| 6,704,738 B1 | * | 3/2004 | de Vries et al. | 707/102 |
| 6,714,920 B1 | * | 3/2004 | Arai | 705/52 |

FOREIGN PATENT DOCUMENTS

EP 0921487 A2 * 6/1999

* cited by examiner

*Primary Examiner*—Jagdish N Patel
(74) *Attorney, Agent, or Firm*—Cowan, Liebowitz & Latman, P.C.

(57) ABSTRACT

An apparatus having a memory box function manages the use states of data stored in memory boxes in units of memory boxes, and also manages charging unit information about the use of data. This makes it possible to calculate charges for the use of data in units of memory boxes.

8 Claims, 9 Drawing Sheets

FIG. 3A

| | |
|---|---|
| MEMORY BOX NUMBER | ~2101 |
| USER | ~2102 |
| SEP / SUB | ~2103 |
| PWD | ~2104 |
| ACCUMULATED DOCUMENT QUEUE | ~2105 |
| ACCUMULATED DOCUMENT COUNT | ~2106 |
| DOCUMENT TRANSFER SETTING | ~2107 |
|     DOCUMENT TRANSFER DESTINATION | ~2108 |
|     DOCUMENT TRANSFER START TIME | ~2109 |
| DOCUMENT RECEPTION SETTING | ~2110 |
|     DOCUMENT PRINT PASSWORD | ~2111 |

FIG. 3B

| | |
|---|---|
| DOCUMENT NUMBER | ~2201 |
| NEXT DOCUMENT ADDRESS | ~2202 |
| FIRST PAGE ADDRESS | ~2203 |
| DOCUMENT PAGE COUNT | ~2204 |
| DOCUMENT CREATION TIME | ~2205 |

FIG. 3C

| | |
|---|---|
| PAGE NUMBER | ~2301 |
| NEXT PAGE ADDRESS | ~2302 |
| DATA SIZE | ~2303 |
| IMAGE SIZE | ~2304 |
| RESOLUTION | ~2305 |
| ACTUAL DATA STORAGE ADDRESS | ~2306 |

FIG. 4

| | |
|---|---|
| JOB TYPE | ~ 2401 |
| RESULT | ~ 2402 |
| MEMORY BOX NUMBER | ~ 2403 |
| COPY COUNT | ~ 2404 |
| PAGE COUNT | ~ 2405 |
| JOB START TIME | ~ 2406 |
| JOB END TIME | ~ 2407 |
|   COMMUNICATION JOB INFORMATION | ~ 2408 |
|     COMMUNICATION PARTNER NAME | ~ 2409 |
|     COMMUNICATION PARTNER NUMBER | ~ 2410 |
|     USED LINE | ~ 2411 |
|     COMMUNICATION SPEED | ~ 2412 |
|   PRINT JOB INFORMATION | ~ 2413 |
|     PRINT RESOLUTION | ~ 2414 |
|     USED CASSETTE | ~ 2415 |
|     COLOR / MONOCHROME | ~ 2416 |
|     FINISHING | ~ 2417 |
|   SCAN JOB INFORMATION | ~ 2418 |
|     COLOR / MONOCHROME | ~ 2419 |
|     IMAGE SIZE | ~ 2420 |
|     RESOLUTION | ~ 2421 |
| USER NUMBER | ~ 2422 |

FIG. 6

| | |
|---|---|
| USER NUMBER | ~ 3101 |
| MEMORY BOX NUMBER | ~ 3102 |
| MEMORY BOX USE | ~ 3103 |
| PRINT COUNT | ~ 3104 |
| PRINT PAGE COUNT | ~ 3105 |
|    MONOCHROME PRINT PAGE COUNT | ~ 3106 |
|    COLOR PRINT PAGE COUNT | ~ 3107 |
|    STAPLED COPY COUNT | ~ 3108 |
| FAX TRANSMISSION COUNT | ~ 3110 |
|    TRANSFER DESTINATION NAME | ~ 3111 |
|       TRANSFER DESTINATION NUMBER | ~ 3112 |
|       TRANSFER COUNT | ~ 3113 |
|       TRANSFER PAGE COUNT | ~ 3114 |
|    DESTINATION 1 NAME | ~ 3120 |
|       NUMBER | ~ 3121 |
|       TRANSMISSION COUNT | ~ 3122 |
|       TRANSMISSION PAGE COUNT | ~ 3123 |
|    DESTINATION 2 NAME | |
|       NUMBER | |
|       TRANSMISSION COUNT | |
|       TRANSMISSION PAGE COUNT | |
| FAX RECEPTION COUNT | ~ 3131 |
|    PARTNER 1 NAME | ~ 3132 |
|       NUMBER | ~ 3133 |
|       RECEPTION COUNT | ~ 3134 |
|       RECEPTION PAGE COUNT | ~ 3135 |
|    PARTNER 2 NAME | |
|       NUMBER | |
|       RECEPTION COUNT | |
|       RECEPTION PAGE COUNT | |
| SCAN COUNT | ~ 3136 |
|    MONOCHROME SCAN COUNT | ~ 3137 |
|    COLOR SCAN COUNT | ~ 3138 |
| SCAN IMAGE SIZE | ~ 3139 |

FIG. 7

| | |
|---|---|
| BASIC CHARGE | ~ 3201 |
| USED CASSETTE | ~ 3210 |
|     CASSETTE A | ~ 3211 |
|     CASSETTE B | ~ 3212 |
| USED COLOR | ~ 3220 |
|     MONOCHROME | ~ 3221 |
|     COLOR | ~ 3222 |
| USED FINISHER | ~ 3230 |
|     STAPLE | ~ 3231 |
|     PUNCH | ~ 3232 |
| USED SCANNER | ~ 3233 |
|     SCANNER A | ~ 3234 |
|     SCANNER B | ~ 3235 |
| USED SCANNER COLOR | ~ 3236 |
|     COLOR | ~ 3237 |
|     MONOCHROME | ~ 3238 |
| OPERATING RESOLUTION | ~ 3239 |
|     600 dpi | ~ 3240 |
|     1200 dpi | ~ 3241 |
| SCAN ORIGINAL SIZE | ~ 3242 |
|     B5 | ~ 3243 |
|     A4 | ~ 3244 |
|     A3 | ~ 3245 |
| SCAN DATA SIZE | ~ 3246 |
|     50 MBYTES | ~ 3247 |
|     100 MBYTES | ~ 3248 |

APPARATUS WHICH CAN BE CONNECTED TO NETWORK, AND CHARGING MANAGEMENT SYSTEM

FIELD OF THE INVENTION

The present invention relates to an apparatus which can be connected to a network, and a charging management system.

BACKGROUND OF THE INVENTION

With the widespread use of networks such as LANs in offices, a plurality of users use an apparatus connected to a network. Some apparatuses of this type are designed to store data to be output or input data in memory boxes. In such a memory box, users, who are permitted to use the apparatus, can be set. In addition, a password to gain access to data in the memory box can be set.

Charging management is performed with respect to data output/input from/to apparatuses connected to a network in units of apparatuses or users.

However, charging is not performed in units of memory boxes for storing data to be output from the apparatuses.

If, therefore, a plurality of users use a given single memory box, it is very difficult to calculate a charge amount for the use of data in the memory box.

SUMMARY OF THE INVENTION

It is an object of the present invention to provide an apparatus which can perform charging management in units of memory boxes and can be connected to a network, and a charging management system.

According to an embodiment of the present invention, there is provided a system including an apparatus which can be connected to a network and having accumulation means for accumulating data, comprising accumulation area setting means for setting the accumulation means as a plurality of accumulation areas, identification information setting means for setting identification information in each accumulation area set by the accumulation area setting means, storage means for storing data in the accumulation area on the basis of the identification information set by the identification information setting means, management means for managing charge information about the data stored by the storage means, and calculation means for calculating a charge amount for each identification information on the basis of the charge information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A to 3C are schematic views showing management records for the memory box function of the MFD 1010 in FIG. 1, in which FIG. 3A is a schematic view showing a management record for one memory box, FIG. 3B is a schematic view showing a management record for information about one document accumulated in a memory box, and FIG. 3C is a schematic view showing a management record for information about one page of a document accumulated in a memory box;

FIG. 4 is a schematic view showing information notified from the MFD 1010 in FIG. 1 to a charging management server 1001 through the network;

FIG. 6 is a schematic view showing a charging management record for each memory box in the charging management server 1001 in FIG. 1;

FIG. 7 is a schematic view showing a charging unit information record in the charging management server 1001 in FIG. 1;

DETAILED DESCRIPTION OF THE PREFERRED EMBODIMENT

An embodiment of the present invention will be described below with reference to the accompanying drawings.

Figure 1:
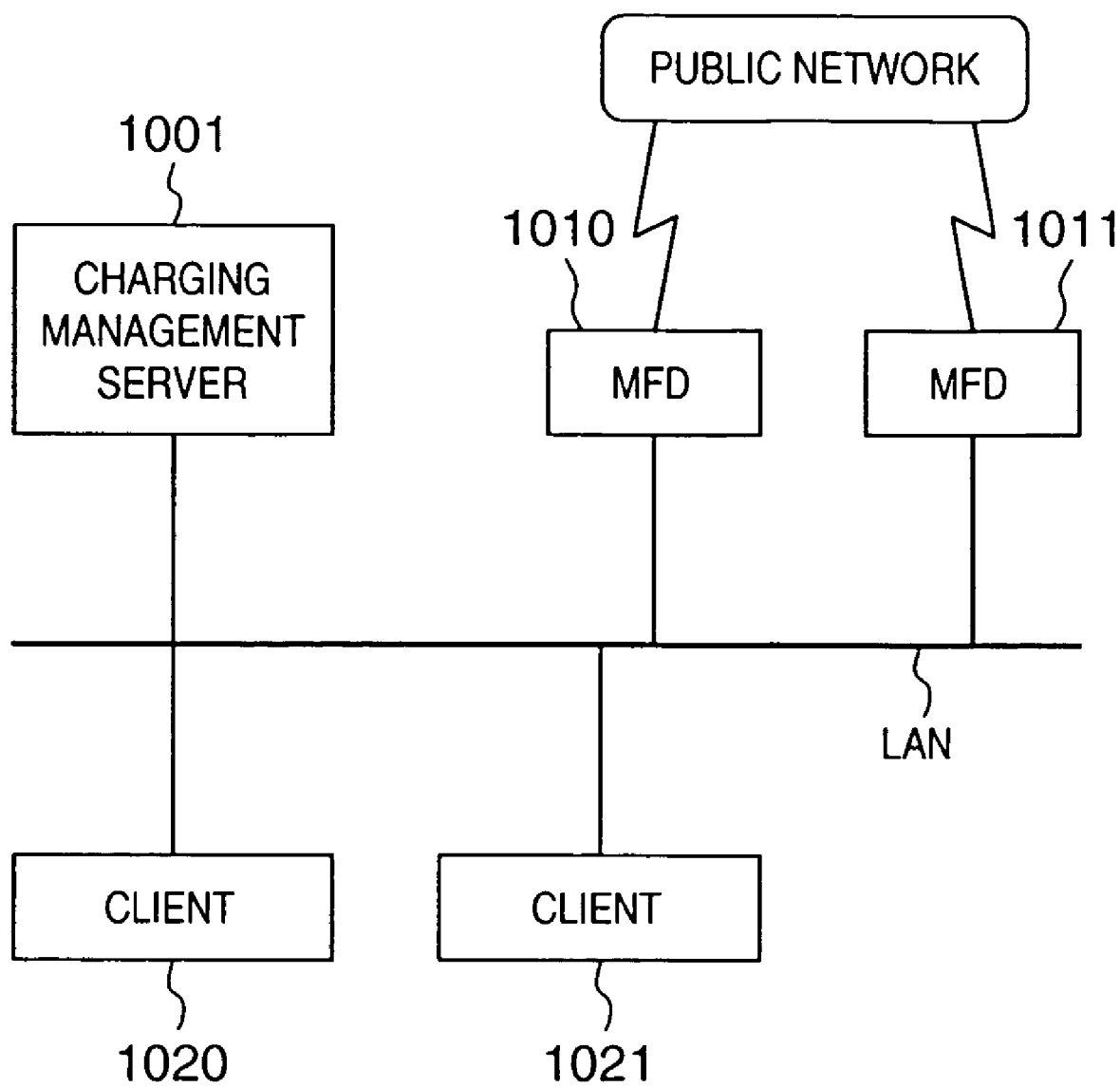
FIG. 1 is a block diagram showing the overall arrangement of a network charging management system according to an embodiment of the present invention.

FIG. 1 is a block diagram showing the overall arrangement of a network charging management system according to an embodiment of the present invention. Referring to FIG. 1, a charging management server 1001 is connected to a plurality of MFDs (Multi-Functional Devices) 1010 and 1011 and clients 1020 and 1021 serving as service environments for the respective users through a network such as a LAN. The MFDs 1010 and 1011 are connected to a public network to perform facsimile communication.

Each of the MFDs 1010 and 1011 is a composite machine having a plurality of functions, e.g., a copy function, printer function, and scanner function, as well as the facsimile communication function. The MFDs 1010 and 1011 execute these services in accordance with instructions from the clients 1020 and 1021. It should be noted that MFDs and clients are not limited to the MFDs 1010 and 1011 and clients 1020 and 1021, and that many MFDs and clients may be arranged on the LAN.

Figure 2:
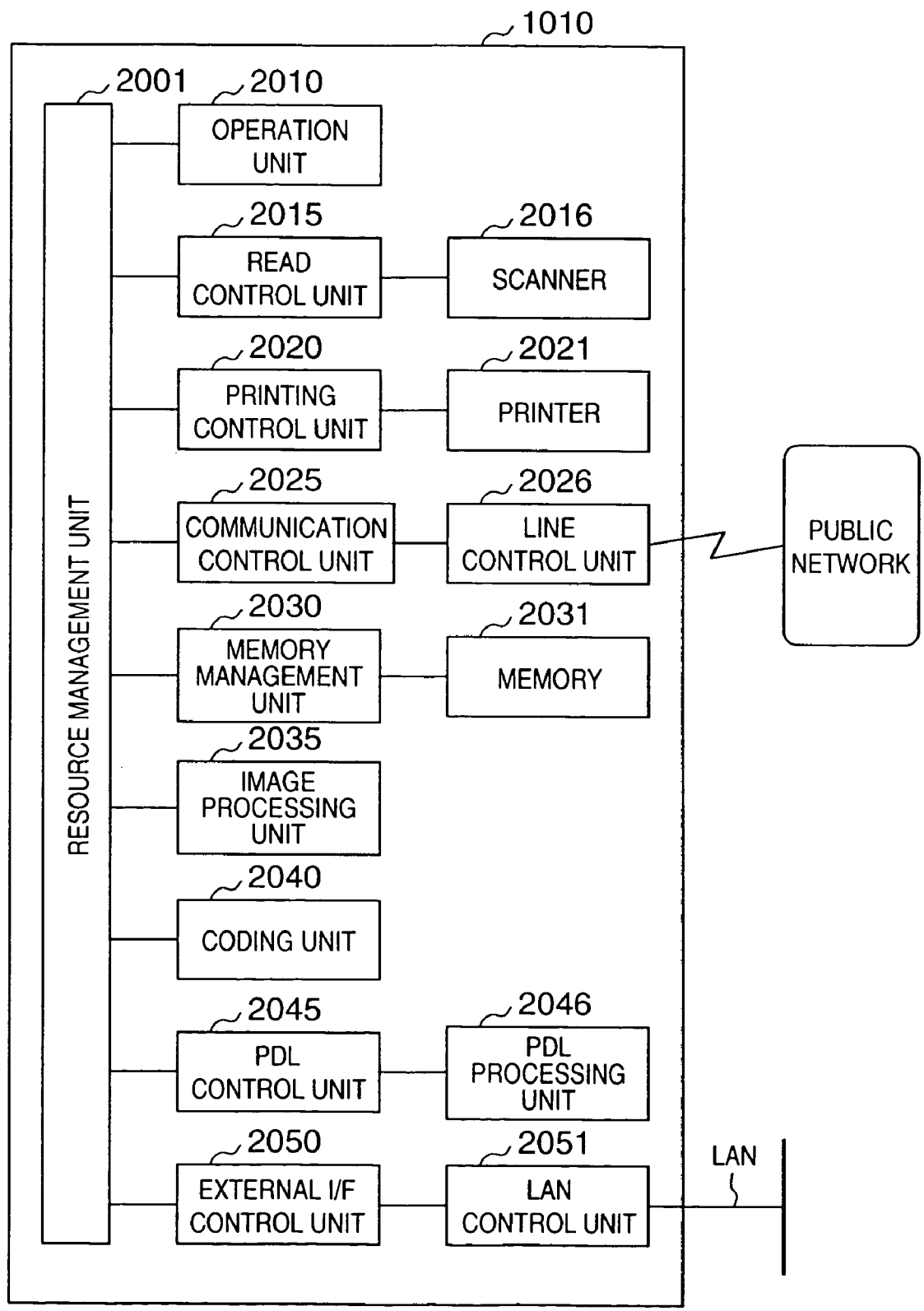
FIG. 2 is a block diagram showing the overall arrangement of an MFD 1010 in FIG. 1.

FIG. 2 is a block diagram showing the overall arrangement of the MFD 1010 in FIG. 1. Note that the MFD 1011 has the same arrangement as that of the MFD 1010, and hence a description thereof will be omitted.

Referring to FIG. 2, a resource management unit 2001 is connected to various resources including an operation unit 2010, a read control unit 2015 connected to a scanner 2016, a printing control unit 2020 connected to a printer 2021, a communication control unit 2025 connected to a line control unit 2026, a memory management unit 2030 connected to a memory 2031, an image processing unit 2035, a coding unit 2040, a PDL control unit 2045 connected to a PDL processing unit 2046, and an external I/F control unit 2050 connected to a LAN control unit 2051. The line control unit 2026 is also connected to an external public network. The LAN control unit 2051 is connected to a LAN. The respective components of the MFD 1010 in FIG. 2 will be sequentially described in detail below.

The resource management unit 2001 manages the overall resources that the unit supports, and performs, for example, scheduling of various jobs requested from the various resources. The operation unit 2010 is a user interface for providing a user with a function as a terminal. With the operation unit 2010, the user can perform various operations, e.g., creating a memory box (to be described later), changing/erasing information registered in the memory box, accumulating documents and images (documents to be described below include images) in the memory box, and printing documents accumulated in the memory box.

The read control unit 2015 controls the image read operation of the scanner 2016. The printing control unit 2020 controls image printing at the printer 2021. The communication control unit 2025 controls normal facsimile transmission/reception through the line control unit 2026. The memory management unit 2030 allocates the resource of the memory 2031 to each control unit. For example, in facsimile reception operation, memory management unit 2030 manages, for example, the accumulation of a facsimile-received document in a memory box, various data as predetermined use states of the document in facsimile reception operation, and the use state of each memory box.

The image processing unit 2035 performs image processing, e.g., changing the size of paper sheet on which an image is to be printed, changing the resolution, and smoothing processing, and performs image processing required for facsimile transmission operation, in particular. The coding unit 2040 performs a predetermined coding/decoding scheme, such as the MH scheme, MR scheme, or MMR scheme, which are generally used for facsimile transmission/reception. The PDL control unit 2045 controls the PDL processing unit 2046 for converting PDL data input through the LAN into video data. The video data obtained by the PDL processing unit 2046 is generally sent to the printing control unit 2020 and output from the printer 2021.

The external I/F control unit 2050 performs control in communicating various data as predetermined use states in facsimile reception operation or the like with the charging management server 1001 on the LAN, which is connected to the external I/F control unit 2050 through the LAN control unit 2051, and also manages the corresponding jobs. For example, the external I/F control unit 2050 controls reception of print jobs and the like transmitted from the clients 1020 and 1021, facsimile reception, and transfer of various data as predetermined use states in data read operation of the scanner 2016 to the charging management server 1001. In addition, the external I/F control unit 2050 notifies the charging management server 1001 of the results of executed jobs.

The facsimile memory box function of the MFD 1010 will be described next. This memory box is a predetermined storage area set in the memory 2031, has unique identification information, and stores data subjected to processing, such as output processing and input processing performed by the MFD 1010. For example, in facsimile reception operation, a facsimile-received document is stored in a memory box having identification information corresponding to identification information acquired in the facsimile reception operation.

The memory box function includes memory box creation processing, accumulation processing for a facsimile-received document or a document read by the scanner into the memory box, print output processing of a document accumulated in the memory box, facsimile transmission processing, and the like.

In the memory box creation processing, a memory box creation window is displayed in accordance with operation with the operation unit 2010, and a memory box is created. At this time, the holder of the memory box, SUB, SEP and PWD recommended by ITU-T.30, a password for printing the received document, a transfer destination, and the like can be registered in the memory box.

In document accumulation processing with respect to the memory box, the resource management unit 2001 controls each associated control unit, an operator (user) is specified in accordance with operation with the operation unit 2010, and the document data of an original that is read by the scanner 2016 is accumulated in the memory box designated by the operator. In addition, in this processing, a received document is also accumulated in a memory box corresponding to the identification information acquired in facsimile reception operation.

In print output processing for a document stored in a memory box, the resource management unit 2001 controls each associated control unit to print out a document, which is accumulated in the memory box in the document accumulation processing with respect to the memory box, from the printer 2021.

In facsimile transmission processing for a document accumulated in a memory box, the resource management unit 2001 controls each associated control unit, and a document in the memory box designated by operation with the operation unit 2010 is transmitted from the line control unit 2026 to a transfer destination through a public network.

Note that various data as predetermined use states are transferred to the charging management server 1001 through the LAN control unit 2051 in correspondence with the document accumulation processing with respect to the memory box, memory box accumulated document output processing, facsimile transmission of the document accumulated in the memory box, and facsimile reception processing.

According to the above description, each process based on the memory box function is performed in accordance with operation with the operation unit 2010. Obviously, however, these processes may be performed in accordance with the operations of the clients 1020 and 1021 connected to a network such as a LAN.

Management records in the memory box function of the facsimile will be described next with reference to FIGS. 3A to 3C. FIGS. 3A to 3C are schematic views showing management records in the memory box function of the MFD 1010. FIG. 3A is a schematic view showing a management record in one memory box. FIG. 3B is a schematic view showing a management record of information associated with one document accumulated in the memory box. FIG. 3C is a schematic view showing a management record of information associated with one page of the document accumulated in the memory box.

Referring to FIG. 3A, in a memory box number 2101, a memory box number identifying a memory box to be managed is stored. A user 2102 is a portion in which the user identification information of a memory box is stored. In this portion, the user number is stored. If a plurality of users use the memory box, a plurality of user numbers are stored. SEP/SUB 2103 is identification information used in facsimile reception operation. In this portion, string data stored in a SEP/SUB frame defined by ITU-T.30 recommendation is stored. PWD 2104 is identification information used in facsimile reception operation. In this portion, string data stored in a PWD frame defined by ITU-T.30 recommendation is stored.

In this embodiment, when SUB and PWD frames are received from a transmitting station in facsimile reception operation, they are collated with the SUB and PWD frames registered in the SEP/SUB 2103 and PWD 2104 in each memory box. If SUB and PWD frames identical to the received SUB and PWD frames are registered in the SEP/SUB 2103 and PWD 2104 as a result of collation, the received facsimile document is stored in the corresponding memory box. If no identical SUB and PWD frames are present, the line is disconnected.

In an accumulated document queue 2105, the management data address of the first document of a plurality of documents accumulated in the memory box is stored. In an accumulated document count 2106, the number of documents accumulated in the memory box is stored.

A document transfer setting 2107, document transfer destination 2108, and document transfer start time 2109 are portions in which information associated with transfer is stored. In the document transfer setting 2107, information indicating whether to transfer a document is stored. If the document is transferred, "1" is stored. Otherwise, "0" is stored. The document transfer destination 2108 and document transfer start time 2109 are portions in which pieces of information which become effective only when "1" is set in the document transfer setting 2107 are stored. In the document transfer destination 2108, the facsimile number of a transfer destination is stored. In the document transfer start time 2109, a document transfer start time is stored. With this operation, when document transfer is set, and a document is accumulated by the accumulated document queue 2105, transfer of the document to the transfer destination is started at the set transfer start time.

Document reception setting 2110 and document print password 2111 are portions in which settings associated with document reception are stored. In the document reception setting 2110, setting information indicating whether to permit facsimile reception for a memory box for document reception is stored. If facsimile reception is permitted, "1" is stored. Otherwise, "0" is stored. In the document print password 2111, a password for printing a received document or document accumulated in a memory box in document accumulation processing is stored. This password is used for the collation of passwords when the user tries to print the document accumulated in the memory box.

Referring to FIG. 3B, a document number 2201 is a portion in which a document number is stored. In a next document address 2202, an address indicating the next document management record is stored. In a first page address 2203, a pointer indicating the data of the first page of a document is stored. In a document page count 2204, the number of pages of this document is stored. In a document creation time 2205, the time at which this document was created is stored.

Referring to FIG. 3C, a page number in a document is stored in a page number 2301. In a next page address 2302, the address of the next page record is stored. In a data size 2303, the size of actual data is stored. In an image size 2304, the paper size (A4, B4, or the like) of the image of the actual data is stored. In a resolution 2305, the resolution of the image of the actual data is stored. In an actual data storage address 2306, the first address of the memory 2031 in which the actual data is stored is stored.

As described above, since the MFD 1010 has the memory box function of managing accumulation of data, e.g., a facsimile-received document, in a memory box and a predetermined use state of each memory box, the use state of the MFD 1010 in units of memory boxes can be easily checked.

In addition, setting a password for each memory box can prevent the document data stored in a memory box from being output to an unauthorized user.

Pieces of information that are notified from the MFD 1010 or 1011 to the charging management server 1001 through the network when processing associated with the memory box function of the MFD 1010 or 1011 in FIG. 1 is performed will be described next with reference to FIG. 4. FIG. 4 is a schematic view showing pieces of information that are informed from the MFD 1010 or 1011 to the charging management server 1001 through the network.

Note that the configuration of data notified from the MFD 1010 is identical to that from the MFD 1011, and hence the MFD 1010 will be exemplified.

Referring to FIG. 4, in a job type 2401, the type of job processed in the MFD 1010 is stored. The job types include "scan accumulation", "reception", "transmission", "polling transmission", "transfer", "accumulated document print", and the like. In a result 2402, the processing result is stored. In a memory box number 2403, the number of the memory box subjected to processing is stored. In a copy count 2404, the number of copies of a processed accumulated document is stored. If, for example, two copies are designated and printing is performed in printing an accumulated document, "2" is stored. In a page count 2405, the number of pages of an accumulated document having undergone processing is stored. In a job start time 2406, the time at which processing for a job started is stored. In a job end time 2407, the time at which processing for a job ended is stored.

A communication job information 2408, communication partner name 2409, communication partner number 2410, used line 2411, and communication speed 2412 are portions that are used when a job is communicated (reception, transmission. polling transmission, transfer, or the like). In the communication job information 2408, "1" is stored when the information of a communicated job is stored, and "0" is stored when the information is not stored. In the communication partner name 2409, the name of a communication partner which the MFD 1010 communicated is stored. In the communication partner number 2410, the subscriber number of a communication partner is stored. In the communication speed 2412, the communication speed at which communication was performed is stored.

Print job information 2413, print resolution 2414, used cassette 2415, color/monochrome 2416, and finishing 2417 are portions used when printing is done in a job. In the print job information 2413, information indicating whether information about a print job is stored is stored. If information about a print job is stored, "1" is stored. Otherwise, "0" is stored. In the print resolution 2414, the resolution of a print in the execution of a print job is stored. In the used cassette 2415, the number of the cassette that is used when the print job is executed is stored. In the color/monochrome 2416, information indicating whether the ink/toner used for printing is color or monochrome is stored. In the finishing 2417, information about processing such as stapling or punching to be performed after the print operation is stored.

Scan job information 2418, color/monochrome 2419, image size 2420, and resolution 2421 are portions used when the type of job is scan accumulation. In the scan job information 2418, information indicating whether scan job information is stored is stored. If scan job information is stored, "1" is stored. Otherwise, "0" is stored. In the color/monochrome 2419, information indicating whether color scanning or monochrome scanning was performed in scan accumulation is stored. In the image size 2420, the paper size (A4, B4, or the like) of a scanned image is stored. In the resolution 2421, the resolution set in the scan operation is stored.

In a user number 2422, a number for identifying the user who executed a job is stored. Although not shown, information about each job includes MFD identification information for identifying each MFD is also stored.

As described above, since the MFD 1010 or 1011 notifies the charging management server 1001 of the use state through the LAN, the charging management server 1001 can easily manage the use state of the MFD 1010 or 1011.

Figure 5:
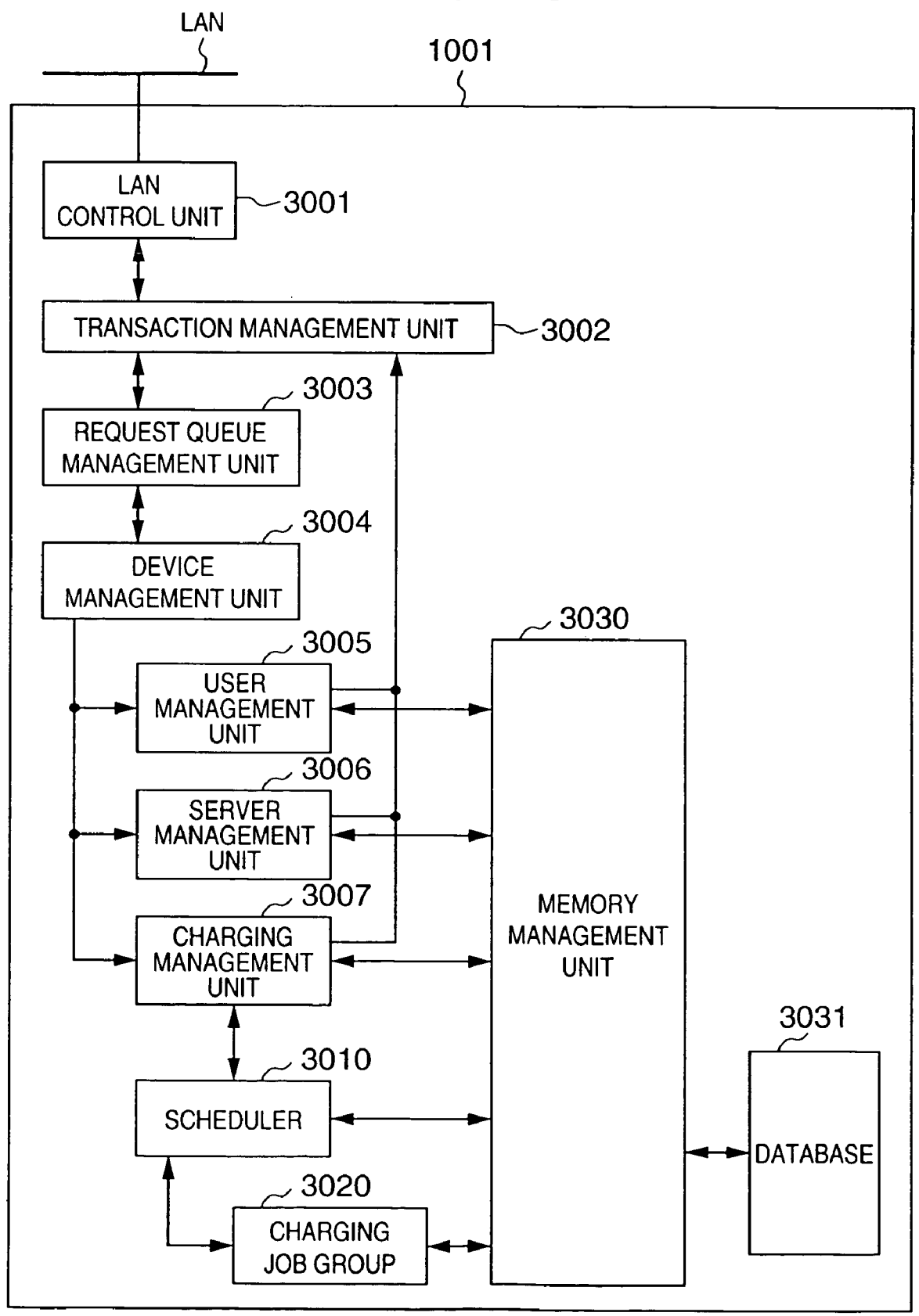
FIG. 5 is a block diagram showing the arrangement of the charging management server 1001 in FIG. 1.

The charging management server 1001 in FIG. 1 will be described next with reference to FIG. 5. FIG. 5 is a block diagram showing the arrangement of the charging management server 1001.

As shown in FIG. 5, a LAN control unit 3001 connected to an external LAN, transaction management unit 3002, request queue management unit 3003, and device management unit 3004 are connected in series. A user management unit 3005, server management unit 3006, and charging management unit 3007 are connected in parallel with the transaction management unit 3002 and device management unit 3004. The user management unit 3005, server management unit 3006, and charging management unit 3007 are further connected to the memory management unit 3030. The charging management unit 3007 is connected to each charging job group 3020 through a scheduler 3010. The scheduler 3010 is connected to a memory management unit 3030. The memory management unit 3030 is further connected to a database 3031.

The LAN control unit 3001 has the basic function provided by a network OS in which a server application is installed. The transaction management unit 3002 individually performs communication processing with the MFDs 1010 and 1011 and clients 1020 and 1021, managed by the charging management server 1001, through the LAN control unit 3001 in consideration of the internal processing result. The request queue management unit 3003 basically manages various request messages asynchronously transferred from the MFDs 1010 and 1011 and clients 1020 and 1021 by temporarily queuing them, and sequentially performs processing corresponding to the request contents. It is also assumed that a request that demands scheduling in the charging management server 1001 is generated.

The device management unit 3004 sends messages including request contents from the MFDs 1010 and 1011 and clients 1020 and 1021, and also from charging management server 1001 in some cases, to the user management unit 3005, server management unit 3006, and charging management unit 3007. The user management unit 3005 processes a job associated with user management, and basically processes jobs associated with the management of the clients 1020 and 1021 (users) and MFDs 1010 and 1011. For example, the user management unit 3005 manages and controls determination on connection (login) request processing from the clients 1020 and 1021 and MFDs 1010 and 1011, handling of charging information managed by the respective users, the job processing states in the MFDs 1010 and 1011, and the resource state.

The server management unit 3006 processes a job associated with server management, and is basically provided with service functions such as a server setting function for a person in charge of the charging management server 1001, data backup function, and service log data acquisition function.

The charging management unit 3007 performs processing associated with overall charging management in the server. In addition, the charging management unit 3007 transfers control to the scheduler 3010 as needed to execute processing of each charging job group 3020 under the control of the scheduler 3010. The memory management unit 3030 accumulates and manages various data in the database 3031, which are processed by the charging management server 1001 under the control of the memory management unit 3030, and refers to and reads out the data, as needed.

FIG. 6 is a schematic view showing a charging management record in each memory box in the charging management server 1001 in FIG. 1. This charging management record is created and managed in units of memory boxes, and is updated every time a job result notification from the MFD 1010 or 1011 to a memory box is received. The charge amount in each memory box is calculated on the basis of this charging management record and the charging unit information record shown in FIG. 7.

Referring to FIG. 6, a user number 3101 is a portion in which a number for identifying a user is stored. In a-memory box number 3102, the memory box number 2101 in FIG. 3 is stored. In memory box use 3103, information indicating whether the memory box is used or not is stored. In a print count 3104, the number of times the document in the memory box is printed is stored.

In a print page count 3105, the cumulative number of pages printed out is stored. In a monochrome print page count 3106, color print page count 3107, and stapled copy count 3108, the number of monochrome print pages, the number of color print pages, and the number of stapled copies are respectively stored. In a FAX transmission count 3110, the cumulative number of times facsimile transmission performed in a memory box is stored. Facsimile transmission performed in the memory box includes polling transmission based on SEP/PWD and transmission by transfer. In a transfer destination name 3111, a transfer destination name is stored. In a transfer destination number 3112, a transfer destination number is stored. In a transfer count 3113, the number of times of transfer is stored. In a transfer page count 3114, the number of pages transferred is stored.

A destination 1 name 3120, number 3121, transmission count 3122, and transmission page count 3123 are portions for managing information about polling transmission performed in the memory box in units of destinations. Areas corresponding to the number of destinations are ensured. FIG. 6 shows a case wherein pieces of information corresponding to two destinations are stored. In the destination 1 name 3120, a destination name is stored. In the number 3121, the subscriber number of the destination is stored. In the transmission count 3122, the number of times of transmission to the destination is stored. In the transmission page count 3123, the number of pages transmitted is stored.

In a FAX reception count 3131, the cumulative number of times of facsimile reception performed in a memory box is stored. A partner 1 name 3132, number 3133, reception count 3134, and reception page count 3135 are portions in which pieces of reception information in the memory box are stored. Areas corresponding to the number of partners are ensured. FIG. 6 shows a case wherein pieces of information corresponding to two partners are stored. In the partner 1 name 3132, a destination name is stored. In the number 3133, the subscriber number of the partner is stored. In the reception count 3134, the number of times of reception is stored. In the reception page count 3135, the number of pages received is stored.

In a scan count 3136, the number of times document accumulation processing was performed with respect to a memory box, i.e., the number of times image data such as a document was accumulated in the memory box by reading an original set on the scanner 2016, is stored. In a monochrome scan count 3137 and color scan count 3138, the numbers of times scanning was performed by the monochrome function and color function are respectively stored. In a scan image size 3139, the size of image data such as a document accumulated in the memory box is stored. Note that this embodiment may further include areas for storing pieces of information, such as the resolution set in scan operation, the scan image size in each of the color and monochrome modes, and the paper size of image data.

Charging management and calculation of charging information in the charging management server 1001 will be described next with reference to FIG. 7. FIG. 7 is a schematic view showing a charging unit information record in the charging management server 1001 in FIG. 1.

Charging unit information record needs to be registered by the user in advance. This information is created by each device (MFD 1010 or 1011) and managed by the charging management server 1001. This information is used to calculate a charge amount (charging information) for each job. A charge amount is calculated by adding extra charges to a basic charge 3201. For extra charges, a used cassette 3210, used color 3220, and used finisher 3230 are set. In the used cassette 3210, the charging information of the cassette used in print operation is stored. For example, a cassette A 3011 and cassette B 3012 are set for the respective types of cassettes, and the corresponding charging units are respectively stored. In the used color 3220, the charging information about the ink or toner used in print operation is stored. For example, monochrome 3221 and color 3222 are set for the respective types of ink, and the corresponding charging units are respectively stored. In the used finisher 3230, the charging information about the finisher used in print output operation is stored. For example, charging units are respectively stored in a staple 3231 and punch 3232.

When document accumulation processing is performed with respect to a memory box, a used scanner 3233, used scanner color 3236, scan original size 3242, and scan data size 3246 are set as extra features. In the used scanner 3233, the charging information about the scanner used to scan an original is stored. For example, a scanner A 3234 and scanner B 3235 are set, in each of which charging information is stored. In the used scanner color 3236, the charging information about the color function used to scan the original is stored. For example, color 3237 and monochrome 3238 are set, in each of which charging information is stored. In an operating resolution 3239, the charging information about the resolution with which the original is scanned is stored. For example, 600 dpi 3240 and 1,200 dpi 3241 is set, in each of which charging information is stored. In a scan original size 3242, the charging information about the paper size of the scanned original is stored. For example, B5 (3243), A4 (3244), and A3 (3245) are set, in each of which charging information is stored. In a scan data size 3246, the charging information about the data size of the scanned original is stored. For example, 50 Mbytes 3247 and 100 Mbytes 3248 are set, in each of which charging information is stored.

Although not shown, the charge for a line in facsimile transmission may be managed in units of memory boxes.

As described above, the charging management server 1001 manages the use states including memory box information which are acquired from the MFDs 1010 and 1011, and also manages the charging unit information about each job in each of the MFDs 1010 and 1011, thereby calculating the charging information of an executed job on the basis of the acquired use states and charging unit information. This makes it possible to perform charging management for each memory box.

Figure 8:
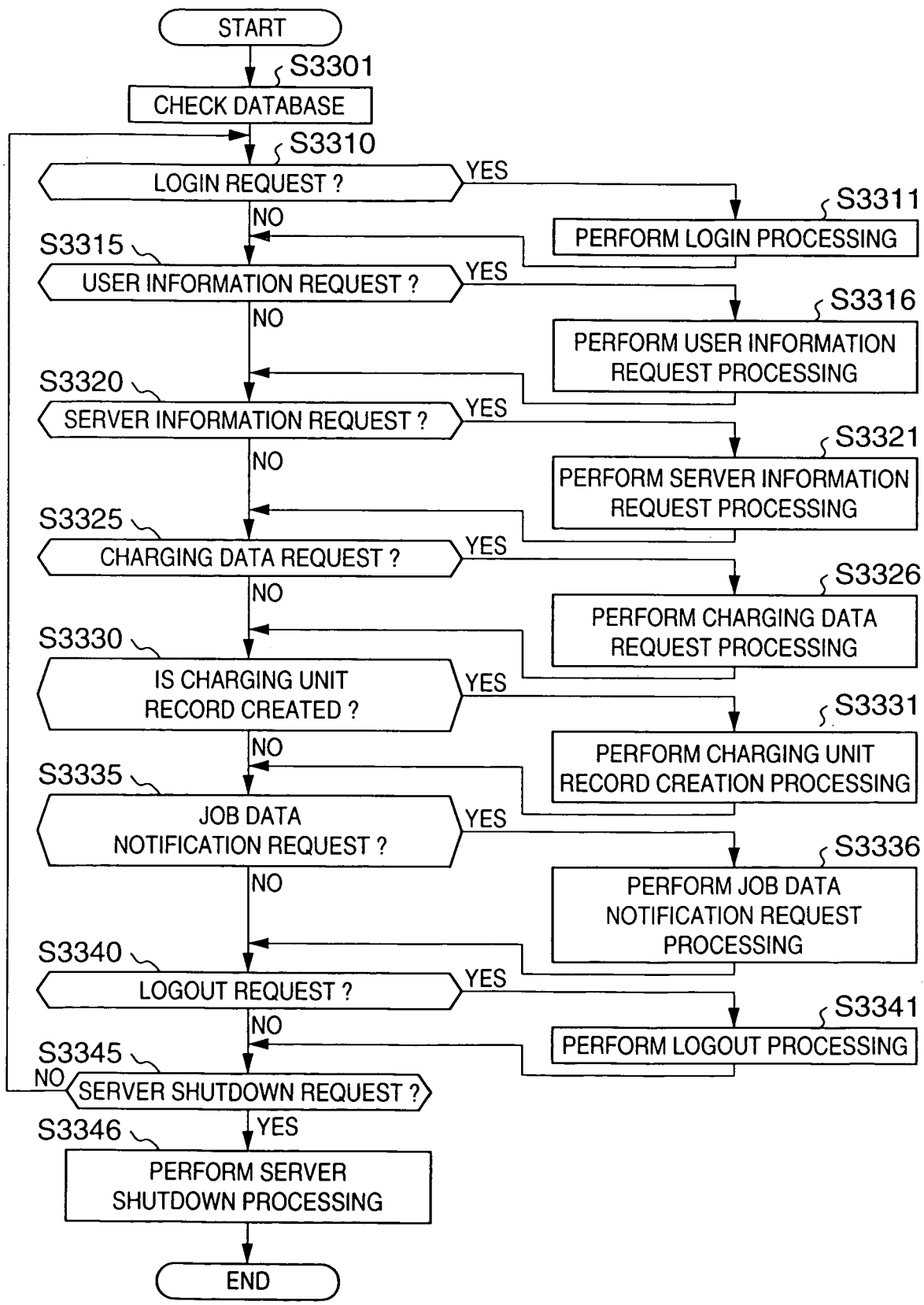
FIG. 8 is a flow chart showing the basic processing for charging management in the charging management server 1001 in FIG. 1.

Basic processing for charging management in the charging management server 1001 will be described next with reference to FIG. 8. FIG. 8 is a flowchart showing the basic processing for charging management in the charging management server 1001.

Referring to FIG. 8, in step S3301, the database is checked when the power supply is turned on. It is then checked whether a login request is sent from the client 1020 or 1021 or the MFD 1010 or 1011 to the charging management server 1001 (step S3310). If it is determined that a login request is generated, the charging management server 1001 performs login processing including a password check and the like (step S3311). This processing is performed in the user management unit 3005 in FIG. 5.

If it is determined in step S3310 that no login request is generated, the flow advances to step S3315 to check whether a user information request is sent from the client 1020 or 1021. If it is determined that a user information request is generated, the charging management server 1001 performs processing (user information request processing) of transferring individual data of each user and common data to the client 1020 or 1021 on the basis of the contents of the user information request (step S3316). This processing is performed in the user management unit 3005 in FIG. 5.

It is determined in step S3315 that no user information request is sent from either of the clients 1020 and 1021, the flow advances to step S3320 to check whether a server information request is sent from either of the clients 1020 and 1021. It is determined that a server information request is generated, the charging management server 1001 performs processing (server information request processing) of transferring data unique to the server to the client 1020 or 1021 on the basis of the contents of the server information request (step S3321). This processing is performed in the server management unit 3006 in FIG. 5.

If it is determined in step S3320 that no server information request is sent from either of the clients 1020 and 1021, the flow advances to step S3325 to check whether a request for charging data of each memory box is sent from either of the clients 1020 and 1021. If it is determined that a charging data request is generated, the charging management server 1001 performs data transfer processing for designated charging data (charging data request processing) (step S3326). This processing is performed in the charging management unit 3007 in FIG. 5. Note that the charging management server 1001 may transfer charging data in units of users or apparatuses as well as in units of memory boxes.

If it is determined in step S3325 that no charging data request is sent from either of the clients 1020 and 1021, the flow advances to step S3330 to check whether a request to create a charging unit record is sent from either of the clients 1020 and 1021. If it is determined that a request to create a charging unit record is sent, the charging management server 1001 creates/changes (charging unit record creation processing) a charging unit record in accordance with the type of device designated (MFDs 1010 or 1011) (step S3331).

If it is determined in step S3330 that no request to create a charging unit record is sent from either of the clients 1020 and 1021, the flow advances to step S3335 to check whether a processing request associated with job data notification processing is sent from either of the MFDs 1010 and 1011. If it is determined that a processing request associated with job data notification is generated, the charging management server 1001 updates the charging management record on the basis of the job data, and performs processing (job data request processing) of the job charging management record in the memory box (step S3336).

If it is determined in step S3335 that no request associated with job data processing is sent from either of the MFDs 1010 and 1011, the flow advances to step S3340 to check whether a logout request is generated. If it is determined that a logout request is generated, logout processing is performed (step S3341).

If it is determined in step S3340 that no logout request is generated, the flow advances to step S3345 to check whether a server shutdown request is generated. If it is determined that a server shutdown request is generated, server shutdown processing is performed (step S3346), and this processing is terminated.

If it is determined in step S3345 that no server shutdown request is generated, the flow returns to step S3310 to repeat processing from step S3310.

Figure 9:
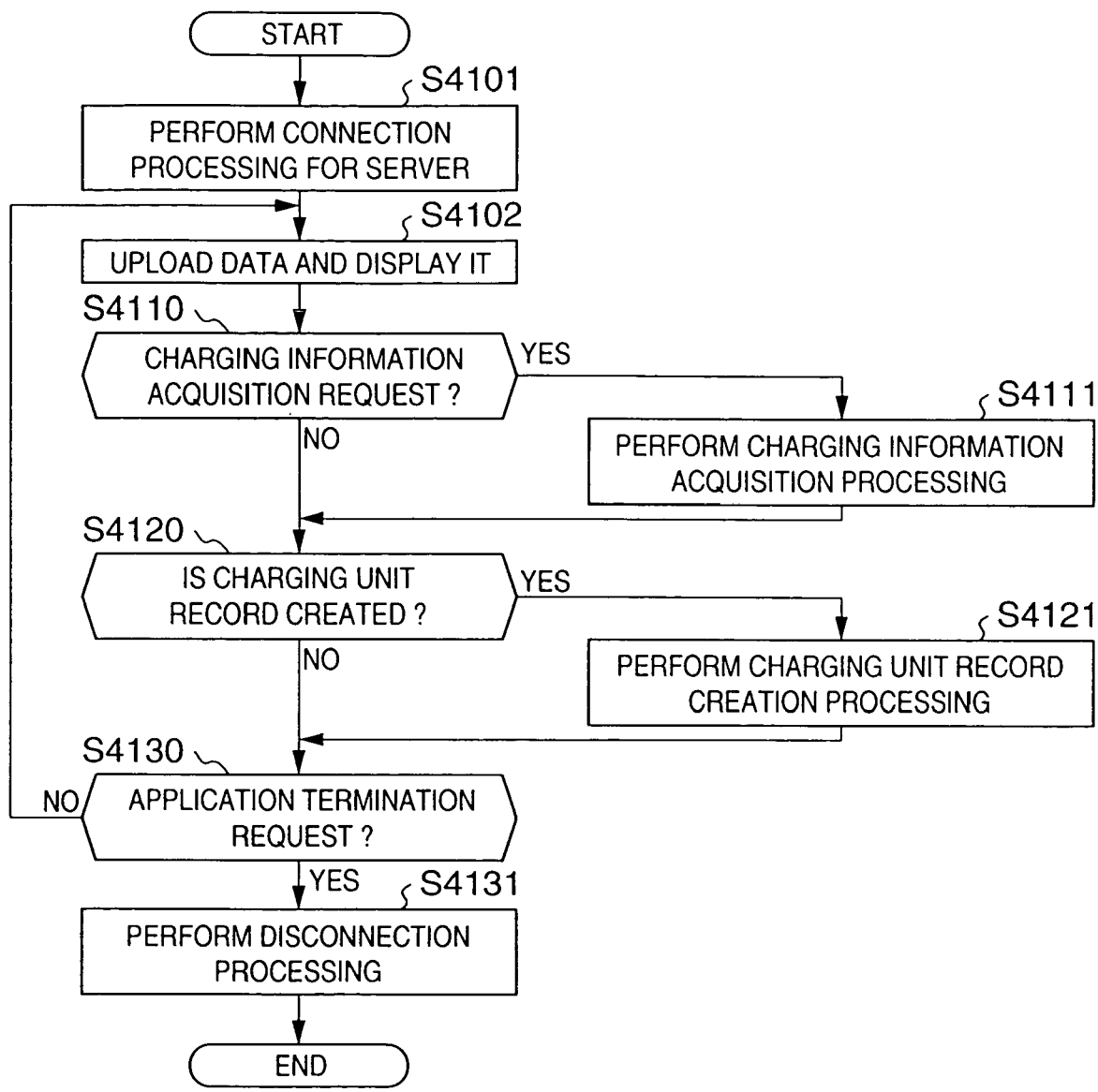
FIG. 9 is a flowchart showing the basic processing for charging management in a client 1020 in FIG. 1.

FIG. 9 is a flowchart showing the basic processing of charging management in the clients 1020 and 1021 in FIG. 1. Referring to FIG. 9, in step S4101, connection processing, login operation, and the like are performed for the charging management server 1001. Data is then acquired from the charging management server 1001 (data upload) and displayed on the screen (step S4102).

In step S4110, it is checked whether a charging information acquisition request is generated by the operation performed by a user. If it is determined that a charging information acquisition request is generated by the operation performed by a user, the charging management server 1001 is inquired of charging data of the memory box, which the user wants to acquire, thus acquiring the result and displaying it (charging information acquisition processing) (step S4111). With this operation, the user can designate a memory box and acquire charging information of each memory box. This apparatus is also configured to acquire charging information and the like in units of users and devices.

If it is determined in step S4110 that no charging information acquisition request is generated by the operation performed by a user, the flow advances to step S4120 to check whether a charging unit record creation request is generated by the operation performed by a user. If it is determined that a charging unit record creation request is generated by the operation performed by a user, a unit record is generated and registered in the charging management server 1001 (charging unit record creation processing) (step S4121).

If it is determined in step S4120 that no charging unit record creation request is generated by the operation performed by a user, the flow advances to step S4130 to check whether a user has performed an operation to terminate a client application. If it is determined that a user has performed the operation, disconnection processing (step S4131) is performed to terminate this processing.

If it is determined in step S4130 that a user has not performed an operation to terminate the client application, the flow returns to step S4102 to repeat the above processing from step S4102.

Note that a multifunctional device may be used in place of a server to manage data about use states and charging unit information about each job, and charging information about each job may be calculated on the basis of the corresponding use state and charging unit information.

According to this embodiment, the apparatus having the memory box function transmits the use state of data accumulated in each memory box to the information processing apparatus for managing charging unit information about the use of the data. This makes it possible to calculate a charge for the use of data in units of memory boxes.

In addition, if another information processing apparatus is connected to the information processing apparatus for managing charging unit information, the connected apparatus can check a calculated charge.

Furthermore, setting of a password for each memory box can prevent document data stored in each memory box from being output to an unauthorized user, thus preventing charging for the output.

Note that the present invention may be applied to either a system constituted by a plurality of devices (e.g., a host computer, an interface device, a reader, a printer, and the like), or an apparatus consisting of a single device (e.g., a copying machine, a facsimile apparatus, or the like).

The present invention is not limited to a LAN and can also be applied to an external network such as the Internet.

The objects of the present invention are also achieved by supplying a storage medium, which records a program code of a software program that can realize the functions of the above embodiment to the system or apparatus, and reading out and executing the program code stored in the storage medium by a computer (or a CPU or MPU) of the system or apparatus.

In this case, the program code itself read out from the storage medium realizes the functions of the above embodiment, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above embodiment may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. A document accumulation apparatus, comprising:
   creation means for creating a memory box corresponding to a predetermined storage area in a memory in accordance with external operation;
   acquisition means for acquiring a document;
   accumulation means for accumulating the document in the memory box;
   print means for executing print processing of the document accumulated in the memory box;
   transfer means for transferring the document accumulated in the memory box to an external apparatus via a communication line; and
   wherein status of use indicating that the document has been processed by said accumulation means, print means or transfer means is accumulated in the memory box together with the document by said accumulation means, transmission means for transmitting the status of use accumulated in the memory box to a billing management apparatus via the communication line.

2. The apparatus according to claim 1, wherein said acquisition means acquires the document by facsimile reception, and further comprising setting means for setting whether to permit the facsimile reception for the memory box.

3. The apparatus according to claim 1, further comprising setting means for setting a password for permitting the print processing by said print means for the memory box.

4. The apparatus according to claim 1, wherein said acquisition means acquires the document by facsimile reception, and wherein the status of use is communication partner name, communication partner number, used line and communication speed in acquisition by said acquisition means.

5. The apparatus according to claim 1, wherein the status of use is print resolution, used cassette, color/monochrome or finishing in print processing by said print means.

6. The apparatus according to claim 1, wherein said acquisition means acquires the document by scanning, and wherein the status of use is color/monochrome, image size or resolution.

7. A method for controlling a document accumulation apparatus, comprising:

a creation step of creating a memory box corresponding to a predetermined storage area in a memory in accordance with external operation;

an acquisition step of acquiring a document;

an accumulation step of accumulating the document in the memory box;

a print step of executing print processing of the document accumulated in the memory box;

a transfer step of transferring the document accumulated in the memory box to an external apparatus via a communication line; and wherein status of use indicating that the document has been processed in the accumulation step, print step or transfer step is accumulated in the memory box together with the document in the accumulation step, a transmission step of transmitting the status of use accumulated in the memory box to a billing management apparatus via the communication line.

8. A computer-readable storage medium storing a program for causing a computer to execute a method according to claim 7.

* * * * *

UNITED STATES PATENT AND TRADEMARK OFFICE
CERTIFICATE OF CORRECTION

| | | |
|---|---|---|
| PATENT NO. | : 7,184,976 B1 | |
| APPLICATION NO. | : 09/658672 | |
| DATED | : February 27, 2007 | |
| INVENTOR(S) | : Takekazu Kumagai | |

It is certified that error appears in the above-identified patent and that said Letters Patent is hereby corrected as shown below:

On The Title Page, after (22) Filed: Sep. 8, 2000 insert:

Item --(30)   Foreign Application Priority Data

Sep. 9, 1999   (JP) .......................... 11-255345--

Signed and Sealed this

Twenty-ninth Day of May, 2007

JON W. DUDAS
*Director of the United States Patent and Trademark Office*